US010706475B2

(12) United States Patent
Kinney et al.

(10) Patent No.: US 10,706,475 B2
(45) Date of Patent: *Jul. 7, 2020

(54) SYSTEM AND METHOD FOR RULES DRIVEN DATA RECORD REDUCTION

(71) Applicant: HARTFORD FIRE INSURANCE COMPANY, Hartford, CT (US)

(72) Inventors: John Kinney, West Hartford, CT (US); Vittoria Pace, Glastonbury, CT (US); Anthony C. Ruszala, Simsbury, CT (US); Thomas L. Snow, III, Simsbury, CT (US); Larry B. Emory, Sanford, FL (US); Robert K. Burns, Fishers, IN (US)

(73) Assignee: Hartford Fire Insurance Company, Hartford, CT (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/947,155

(22) Filed: Apr. 6, 2018

(65) Prior Publication Data
US 2018/0225773 A1    Aug. 9, 2018

Related U.S. Application Data

(63) Continuation of application No. 14/051,703, filed on Oct. 11, 2013, now Pat. No. 9,940,675.

(51) Int. Cl.
*G06Q 10/10*    (2012.01)
*G06Q 40/08*    (2012.01)

(52) U.S. Cl.
CPC .................. *G06Q 40/08* (2013.01)

(58) Field of Classification Search
CPC ....................................................... G06Q 40/08
USPC ............................................................. 705/4
See application file for complete search history.

(56) References Cited

U.S. PATENT DOCUMENTS

| 6,343,271 | B1* | 1/2002 | Peterson ............... G06Q 40/02 705/4 |
| 7,395,217 | B1 | 7/2008 | Stevens et al. |
| 7,921,123 | B2 | 4/2011 | Satlow |
| 7,953,615 | B2 | 5/2011 | Aquila et al. |
| 8,180,668 | B2 | 5/2012 | Wargin et al. |
| 8,401,896 | B2 | 3/2013 | Wargin et al. |
| 8,515,786 | B2 | 8/2013 | Goldfarb |
| 2002/0035488 | A1 | 3/2002 | Aquila et al. |
| 2002/0147867 | A1* | 10/2002 | Satlow ................. G06F 19/328 710/100 |
| 2003/0135397 | A1 | 7/2003 | Halow et al. |
| 2004/0128182 | A1* | 7/2004 | Pepoon ................. G06Q 10/10 705/4 |

(Continued)

*Primary Examiner* — Robert R Niquette
(74) *Attorney, Agent, or Firm* — Howard IP Law Group.PC

(57) ABSTRACT

According to some embodiments, data is received indicative of a plurality of insurance claims submitted in connection with insurance policies. A rules driven claim processing engine may then apply a first exclusion filter to the received plurality of claims, wherein the first exclusion filter operates to remove claims from the received plurality of claims to create a first subset of claims. A second exclusion filter may then be applied to the first subset of claims, wherein the second exclusion filter operates to remove claims from the first subset of claims to create a second subset of claims. It may then be automatically arranged for the second subset of claims to be processed via an expedited claim processing workflow.

16 Claims, 12 Drawing Sheets

(56) References Cited

U.S. PATENT DOCUMENTS

| | | |
|---|---|---|
| 2005/0203828 A1 | 9/2005 | Lyakovetsky |
| 2008/0154651 A1 | 6/2008 | Kenefick et al. |
| 2009/0106053 A1 | 4/2009 | Walker et al. |
| 2009/0216803 A1 | 8/2009 | Goldfarb |
| 2010/0256985 A1 | 10/2010 | Nix et al. |
| 2011/0178825 A1 | 7/2011 | Wargin et al. |
| 2012/0029952 A1 | 2/2012 | Szlam |
| 2012/0143634 A1 | 6/2012 | Beyda et al. |
| 2012/0179496 A1 | 7/2012 | Wargin et al. |
| 2014/0067428 A1* | 3/2014 | Snyder .................. G06Q 10/06 705/4 |

* cited by examiner

| CLAIM IDENTIFIER 502 | INSURANCE TYPE 504 | JURISDICTION 506 | EXCLUDED FROM EXPEDITED WORKFLOW? 508 | ASSIGNED CLAIM HANDLER IDENTIFIER 510 |
|---|---|---|---|---|
| C_100001 | PERSONAL | NY | NO | H_101 |
| C_100002 | COMMERCIAL | CT | YES | H_102 |
| C_100003 | PERSONAL | MI | YES | H_103 |
| C_100004 | PERSONAL | FL | NO | H_101 |
| C_100005 | PERSONAL | CA | NO | H_101 |

SYSTEM AND METHOD FOR RULES DRIVEN DATA RECORD REDUCTION

CROSS-REFERENCE TO RELATED APPLICATIONS

This application is a continuation application of co-pending U.S. patent application Ser. No. 14/051,703, entitled System and Method for Rules Driven Insurance Claim Processing, filed Oct. 11, 2013, the contents of which are hereby incorporated herein by reference in their entirety for all purposes.

FIELD

The present invention relates to computer systems and more particularly to computer systems that provide rules driven insurance claim processing.

BACKGROUND

An insurer may provide payments when claims are made in connection with an insurance policy. For example, an employee who is injured while working might receive payments associated with a workers' compensation insurance policy purchased by his or her employer. Similarly, a person involved in an automobile accident may receive a payment in connection with an automobile insurance policy. The insurer may assign a claim handler to communicate with a claimant, an employer, another insurer, and/or medical service providers to help determine the appropriate amount of payment. Note that submitted claims may involve various amounts of work by a claim handler. For example, one submitted insurance claim might be relatively straightforward while another claim involves complex determinations of liability and/or injury issues.

In one approach, a received insurance claim is assigned to a claim handler in a random or round robin manner. This, however, might lead to one claim handler having a significantly more complex workload as compared to another claim handler. Moreover, manually determining which claim handler should be assigned to each individual insurance claim can be time consuming task, especially when there are a substantial number of claims to be analyzed. For example, an insurer might receive tens of thousands of new insurance claims each year (which might represent a billion dollars of potential liability). It would therefore be desirable to provide systems and methods to facilitate the assignment of insurance claims to claim handlers, in an automated, efficient, and accurate manner.

SUMMARY

According to some embodiments, systems, methods, apparatus, computer program code and means may facilitate the assignment of insurance claims to claim handlers. In some embodiments, a communication device may receive data indicative of a plurality of insurance claims submitted in connection with insurance policies. A first exclusion filter may be applied to the received plurality of claims, wherein the first exclusion filter operates to remove claims from the received plurality of claims to create a first subset of claims. Moreover, a second exclusion filter may be applied to the first subset of claims, wherein the second exclusion filter operates to remove claims from the first subset of claims to create a second subset of claims. It may then be automatically arranged for the second subset of claims to be processed via an expedited claim processing workflow.

A technical effect of some embodiments of the invention is an improved and computerized method to facilitate the assignment of insurance claims to claim handlers. With these and other advantages and features that will become hereinafter apparent, a more complete understanding of the nature of the invention can be obtained by referring to the following detailed description and to the drawings appended hereto.

DETAILED DESCRIPTION

An insurer may provide payments when claims are made in connection with an insurance policy, such as a workers' compensation or automobile insurance policy. Note that embodiments may also be associated with other types of insurance, including long term disability insurance, short term disability insurance, and/or flexible combinations of short and long term disability insurance.

Figure 1:
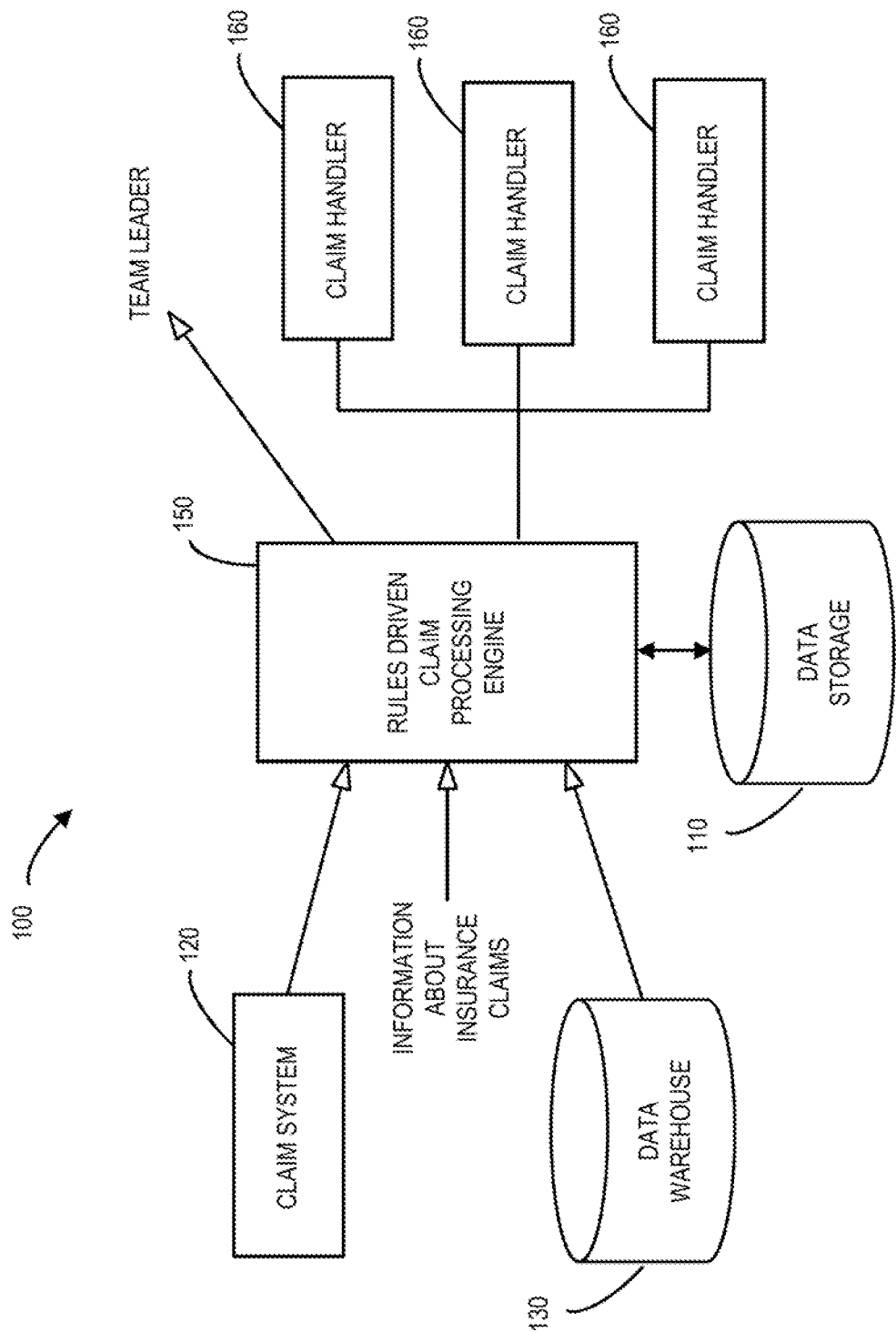
FIG. 1 is block diagram of a system according to some embodiments of the present invention.

Manually determining which claim handler should be assigned to each individual insurance claim can be time consuming and difficult task, especially when there are a substantial number of claims to be analyzed. It would therefore be desirable to provide systems and methods to facilitate the assignment of insurance claims to claim handlers. FIG. 1 is block diagram of a system 100 according to some embodiments of the present invention. In particular, the system 100 includes a rules driven claim processing engine 150 that receives information about insurance claims (e.g., by receiving an electronic file from a team leader, an employer, an employee, an insurance agent, a medical service provider, or a data storage unit 110). According to some embodiments, incoming telephone calls and/or documents from a doctor may be used to create information in a claim system 120 which, in turn, can provide information to the rules driven claim processing engine 150. In other embodiments, the rules driven claim processing engine 150 may retrieve information from a data warehouse 130 (e.g., when the rules driven claim processing engine 150 is associated with an automobile insurance system, some information may be copied from an automobile insurance data warehouse). In other embodiments, some or all of the information about an insurance claim may be received via a claim submission process. The rules driven claim processing engine 150 may, according to some embodiments, help identify insurance claims that can be processed via an expedited workflow. According to some embodiments, historical information may be used to generate appropriate claim processing rule to be applied based on the specific facts of the insurance claim being processed.

The rules driven claim processing engine 150 might be, for example, associated with a Personal Computers (PC), laptop computer, an enterprise server, a server farm, and/or a database or similar storage devices. The rules driven claim processing engine 150 may, according to some embodiments, be associated with an insurance provider.

According to some embodiments, an "automated" rules driven claim processing engine 150 may facilitate the assignment of insurance claims to claim handlers 160. For example, the rules driven claim processing engine 150 may automatically output a recommended claim classification for a received insurance claim (e.g., to a team leader) which may then be used to facilitate assignment of a claim handler 160. As used herein, the term "automated" may refer to, for example, actions that can be performed with little (or no) intervention by a human.

As used herein, devices, including those associated with the rules driven claim processing engine 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The rules driven claim processing engine 150 may store information into and/or retrieve information from the data storage 110. The data storage 110 might be associated with, for example, a client, an employer, or insurance policy and might store data associated with past and current insurance claims and/or payments. The data storage 110 may be locally stored or reside remote from the insurance claim rules driven claim processing engine 150. As will be described further below, the data storage 110 may be used by the rules driven claim processing engine 150 to generate predictive models. According to some embodiments, the rules driven claim processing engine 150 communicates a recommended claim processing workflow (e.g., expedited or normal workflows), such as by transmitting an electronic file to a claim handler 160, a client device, an insurance agent or analyst platform, an email server, a workflow management system, etc. In other embodiments, the rules driven claim processing engine 150 might output a recommended claim workflow indication to a team leader who might select a claim handler based on that indication or override the indication based on other factors associated with the insurance claim.

Although a single rules driven claim processing engine 150 is shown in FIG. 1, any number of such devices may be included. Moreover, various devices described herein might be combined according to embodiments of the present invention. For example, in some embodiments, the claim rules driven claim processing engine 150 and data storage 110 might be co-located and/or may comprise a single apparatus.

Figure 2:
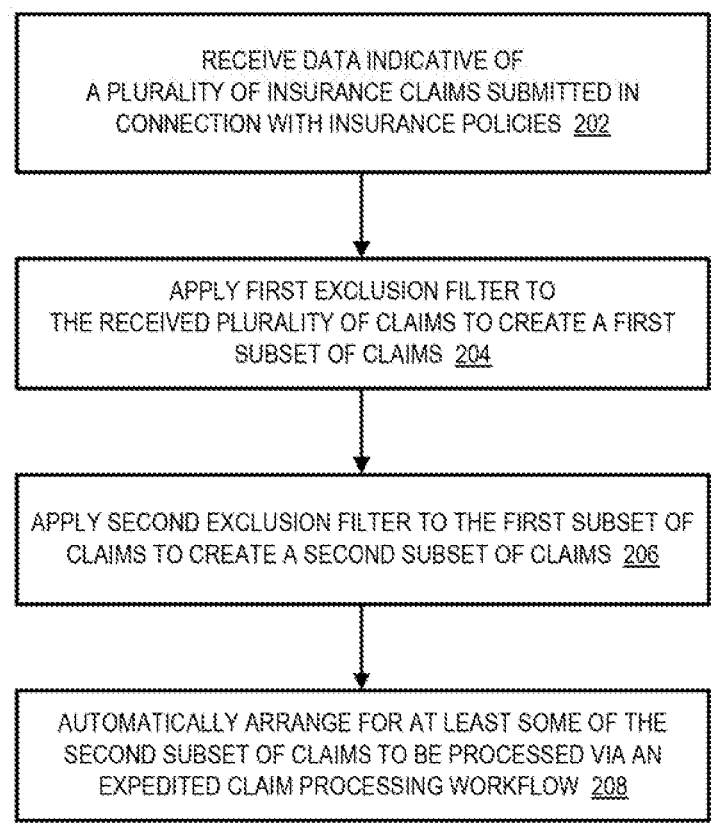
FIG. 2 illustrates a method that might be performed in accordance with some embodiments.

FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, data may be received indicative of a plurality of insurance claims submitted in connection with insurance policies. The insurance claims might be associated with, for example, workers' compensation insurance claims and/or automobile insurance claims. Note that the data indicative of insurance claims might be received via submitted paper claims, a telephone call center, and/or an online claim submission web page.

At 204, a first "exclusion filter" may be applied to the received plurality of claims. The first exclusion filter may, for example, operate to remove claims from the received plurality of claims to create a first subset of claims. Similarly, at 206 a second exclusion filter may then be applied to the first subset of claims. The second exclusion filter may operate to remove additional claims from the first subset of claims to create a second subset of claims.

These exclusion filters may help identify which claims are relatively straightforward and, as a result, may be eligible to be handled by an expedited claim processing workflow. According to some embodiments, an exclusion filter might be associated with an insurance policy type associated with an insurance claim. For example, "commercial" insurance policies may be inherently more complex as compared to "personal" insurance policies and, as a result, may be automatically excluded from the expedited workflow. As another example, an exclusion filter might represent a rule based on a geographic location associated with an insurance claim (e.g., claims arising from accidents that occurred in a particular jurisdiction may involve additional processing steps that make them ineligible for an expedited workflow).

According to some embodiments, an exclusion filter may represent a rule based on a threshold monetary amount associated with an insurance claim. For example, a claim might be eligible for expedited processing if it does not represent a substantial amount of potential liability. As another example, an exclusion filter may represent a rule based on how difficult it will be to ascertain liability associated with an insurance claim and/or an injury associated with an insurance claim. For example, an insurance claim where it is obvious who is at fault (e.g., when one automobile involved in an accident was parked at the time the accident occurred) and the type of injury is relatively straightforward may be eligible for expedited processing. As still another example, an exclusion filter might comprise a rule such that all submitted insurances claim having at least one party who has already obtained legal representation may be ineligible for expedited processing. An exclusion filter may represent a rule based on particular types of injuries. For example, relatively series injuries (e.g., back injuries, injuries to internal organs, etc.) may be assumed to be ineligible for expedited processing because of the need to review medical reports, contact healthcare providers, etc.

At 208, it may be automatically arranged for at least some of the second subset of claims to be processed via an expedited claim processing workflow. That is, the relatively complex and/or difficult claims may have been automatically excluded from the second subset (via the exclusion filters) and the remaining claims may be assigned to claim handlers and/or processes that can quickly settle the matters. According to some embodiments, information about the second subset of claims (e.g., a list of identifiers) may be automatically transmitted to an email server, a workflow application, a report generator, and/or a calendar application. An indication of the second set of claims may also be output to a team leader and/or automatically routed to a predetermined claim handler or team associated with an expedited claim processing workflow. According to some embodiments, the expedited workflow may be associated with a straight through claim process (e.g., a claim could be automatically paid by the system rather than an adjuster if an estimate meets specified criteria).

Figure 3A:
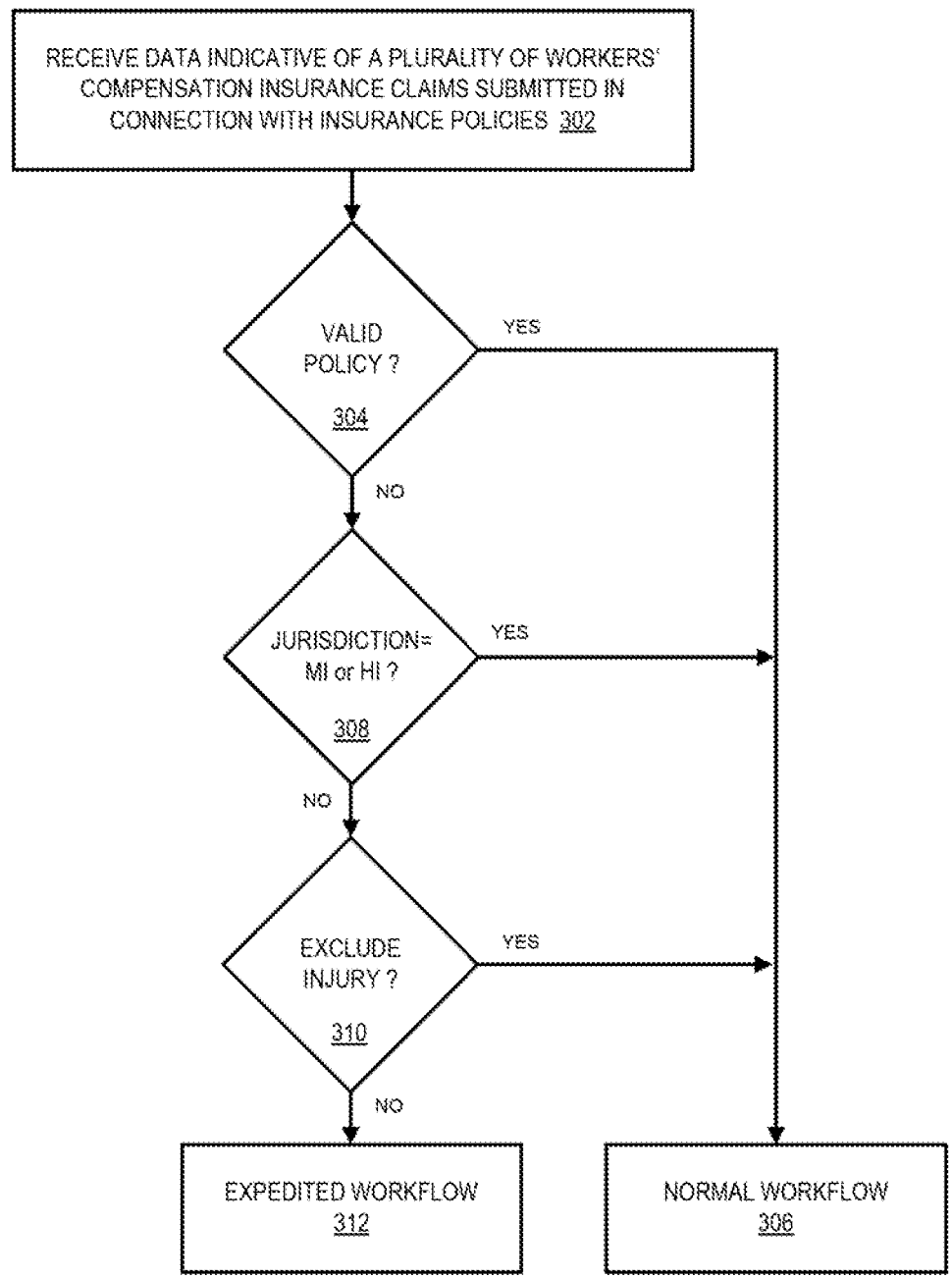
FIGS. 3A and 3B are examples of methods that might be performed according to some embodiments.

Consider, for example, FIG. 3A which illustrates one method that might be performed by some or all of the elements of the system 100 described with respect to FIG. 1 according to some embodiments of the present invention. In this example, data is received at 302 indicative of a plurality of workers' compensation insurance claims submitted in connection with insurance policies. The data may be received, for example, in substantially real time or on a periodic basis (e.g., a batch of submitted claims might be received on a daily basis).

Exclusion filters may then be applied to the received claims. In particular, a claim compensability exclusion filter might be applied to the received claims at 304. The claim compensability exclusion filter might evaluate, for example, whether or not the claim is associated with a valid workers' compensation insurance policy. Claims that are not immediately associated with a valid insurance policy may be ineligible for expedited processing and may instead be processed via a normal workflow at 306 (e.g., the claim handler may further investigate the claim).

A geographic location exclusion filter may then be applied to the remaining workers' compensation insurance claims at 308. For example, claims associated with insurance policies and/or accidents that occurred in Michigan or Hawaii might be identified at 308 and assigned to a normal insurance claim processing workflow at 306. Similarly, claims associated with a particular types of injuries may be identified at 310 and assigned to the normal insurance claim processing workflow at 306 (e.g., because those types of injuries may make expedited processing impractical). The remaining claims may therefore be eligible for an expedited workflow at 312. Although only three exclusion filters are illustrated in FIG. 3A, note that any number of such exclusion filters may be applied as appropriate. For example, exclusion filters might be associated with workers' compensation claims that are associated with disabilities, a possibility of indemnity payments, and/or issues of compensability.

Figure 3B:
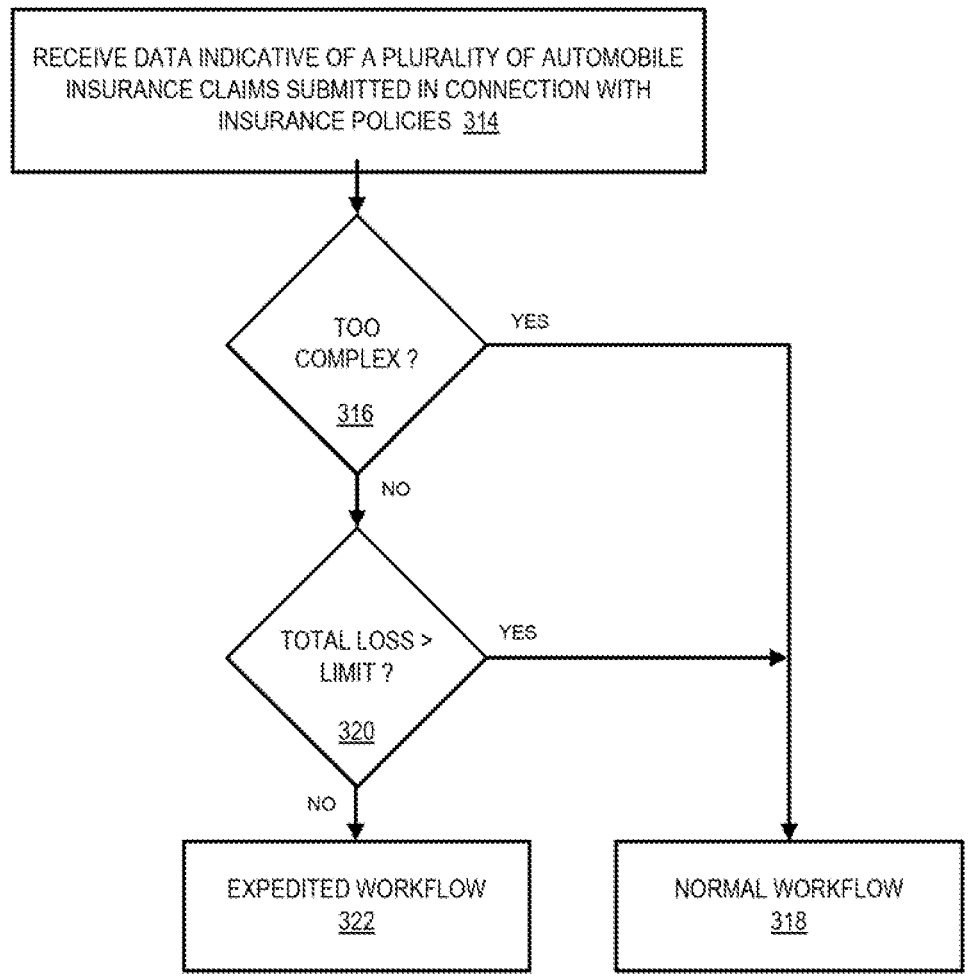

Now consider FIG. 3B, which illustrates another method that might be performed by some or all of the elements of the system 100 described with respect to FIG. 1 according to some embodiments of the present invention. In this example, data is received at 314 indicative of a plurality of automobile insurance claims submitted in connection with insurance policies. Exclusion filters may then be applied to the received claims. In particular, a claim complexity exclusion filter might be applied to the received claims at 316. The claim complexity exclusion filter might evaluate, for example, whether or not the claim is associated with an unclear liability determination, commercial property, etc. Claims that are too complex may be ineligible for expedited processing and may instead be processed via a normal workflow at 318 (e.g., the claim handler may further investigate the claim).

A total loss amount exclusion filter may then be applied to the remaining automobile insurance claims at 320. For example, claims associated with loss amounts over a predetermined threshold value might be identified at 320 and assigned to a normal insurance claim processing workflow at 318. According to some embodiments, claims associated with a vehicle classified as a "total loss" (that is, the damage to the vehicle as a result of an accident cannot be repaired) may be eliminated. The claims remaining after 320 may represent the set of claims that are eligible for an expedited workflow at 322.

Figure 4:
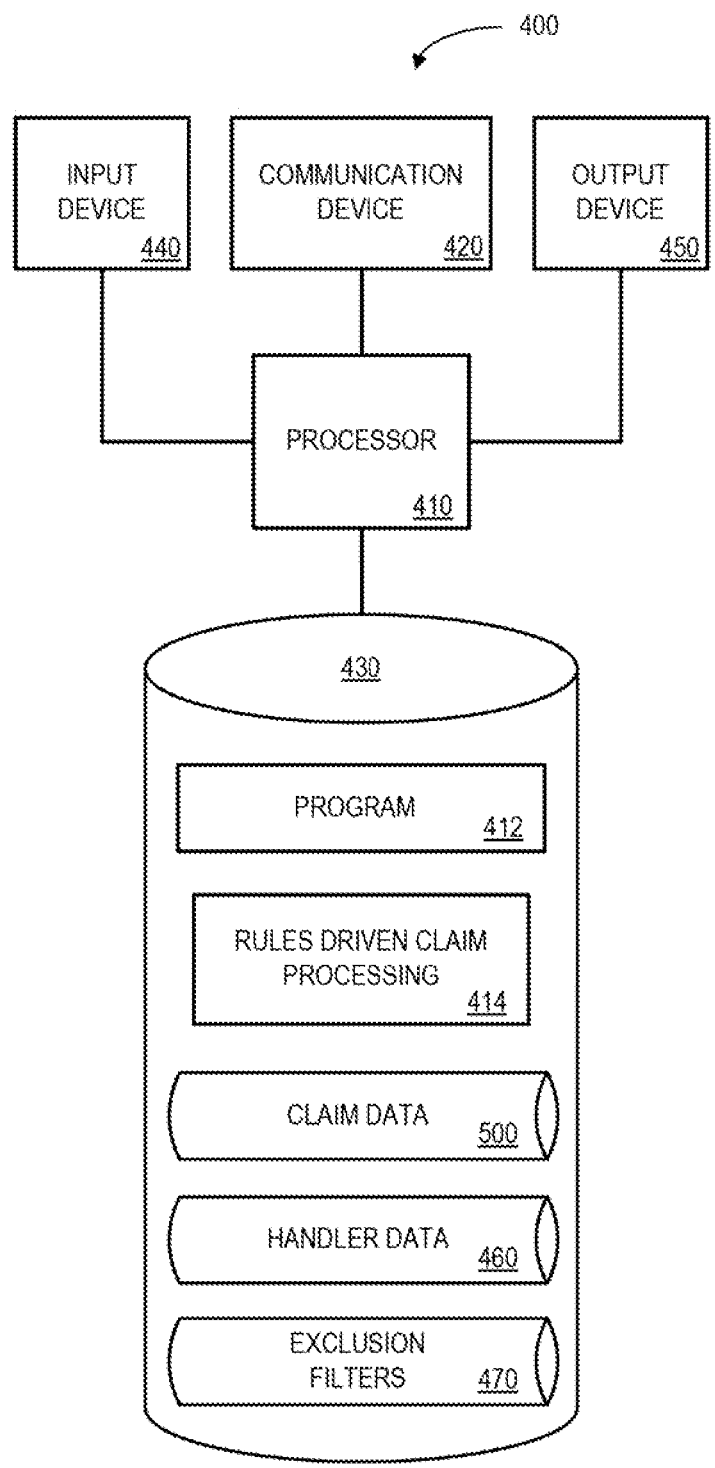
FIG. 4 is block diagram of a rules driven insurance claim processing tool or platform according to some embodiments of the present invention.

Thus, application of the exclusion filters may reduce a received set of claims by sequentially removing potentially difficult or complex claims from the pool that may be eligible for expedited processing. Note that the embodiments described herein may be implemented using any number of different hardware configurations. For example, FIG. 4 illustrates a rules driven claim processing platform 400 that may be, for example, associated with the system 100 of FIG. 1. The rules driven claim processing platform 400 comprises a processor 410, such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more claim systems, remote team leaders, and/or claim handler devices. The rules driven claim processing platform 400 further includes an input device 440 (e.g., a mouse and/or keyboard to enter information about exclusion filters or rules) and an output device 450 (e.g., to output a recommended subset of insurance claims for expedited handling).

The processor 410 also communicates with a storage device 430. The storage device 430 may comprise any appropriate information storage device, including combinations of magnetic storage devices (e.g., a hard disk drive), optical storage devices, mobile telephones, and/or semiconductor memory devices. The storage device 430 stores a program 412 and/or rules driven claim processing logic 414 for controlling the processor 410. The processor 410 performs instructions of the programs 412, 414, and thereby operates in accordance with any of the embodiments described herein. For example, the processor 410 may receive data indicative of a plurality of insurance claims submitted in connection with insurance policies. The processor 410 may then apply a first exclusion filter to the received plurality of claims, wherein the first exclusion filter operates to remove claims from the received plurality of claims to create a first subset of claims. A second exclusion filter may then be applied by the processor 410 to the first subset of claims, wherein the second exclusion filter operates to remove claims from the first subset of claims to create a second subset of claims. The processor 410 may then automatically arrange for the second subset of claims to be processed via an expedited claim processing workflow.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

As used herein, information may be "received" by or "transmitted" to, for example: (i) the rules driven claim processing platform 400 from another device; or (ii) a software application or module within the rules driven claim processing platform 400 from another software application, module, or any other source.

In some embodiments (such as shown in FIG. 4), the storage device 430 further stores an insurance claim database 500, claim handler data 460 (e.g., indicating which handlers specialize in expedited claim processing), and exclusion filter rules 470. An example of a database that may be used in connection with the rules driven claim processing platform 400 will now be described in detail with respect to FIG. 5. Note that the database described herein is only one example, and additional and/or different information may be stored therein. Moreover, various databases might be split or combined in accordance with any of the embodiments described herein. For example, the claim handler data 460 and/or exclusion filter rules 470 might be combined and/or linked to each other within the rules driven claim processing application 414.

Figure 5:
FIG. 5 is a tabular portion of an insurance claim database according to some embodiments.

Referring to FIG. 5, a table is shown that represents the insurance claim database 500 that may be stored at the rules driven claim processing platform 400 according to some embodiments. The table may include, for example, entries identifying insurance claims submitted under insurance policies. The table may also define fields 502, 504, 506, 508, 510 for each of the entries. The fields 502, 504, 506, 508, 510 may, according to some embodiments, specify: a claim identifier 502, an insurance type 504, a jurisdiction 506, an indication of whether or not the claim is excluded from an expedited workflow 508, and an assigned claim handler identifier 510. The insurance claim database 500 may be created and updated, for example, based on information electrically received on a periodic basis.

The claim identifier 502 may be, for example, a unique alphanumeric code identifying a claim submitted in connection with an insurance policy. The insurance type 504 and jurisdiction 506 may represent information associated with a particular claim. Based on the insurance type 504 and jurisdiction 506, it may be determined whether or not the claim should be excluded from an expedited workflow 508. In the example of FIG. 5, claims associated with an insurance type 504 of "commercial" are to be excluded from the expedited workflow. In addition, claims associated with Michigan or Hawaii are to be excluded from the expedited workflow. As a result, claim "C_100002" is excluded (because it is "commercial") and claim "C_100003" is excluded (because it is associated with Michigan) while the other claims are not excluded. The non-excluded claims may be assigned to claim handler identifier 510 "H_101" who specializes in the expedited insurance claim processing. Although particular data elements are illustrated in FIG. 5, note that the claim database 500 could include any other type of information in addition to or instead of the identified elements. For example, the claim database 500 might include an injury type or description or an indication that vehicle is considered a "total loss" (e.g., the damage cannot be practically repaired).

Figure 6:
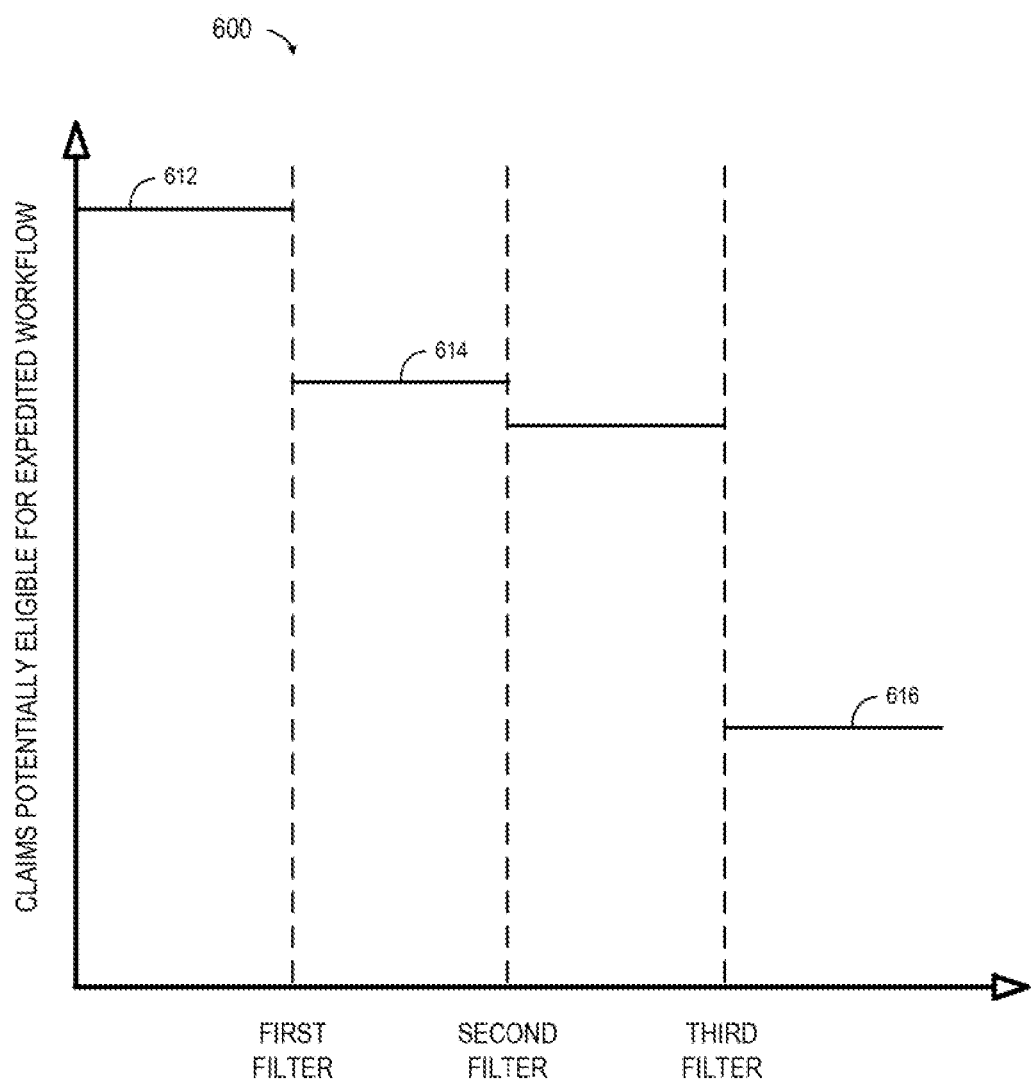
FIG. 6 is a graph illustrating an overall number of insurance claims that may be potentially eligible for processing via an expedited workflow in accordance with some embodiments.

Thus, embodiments may be associated with a series of exclusion filters to help identify which claims may be appropriately handled via an expedited workflow. For example, FIG. 6 is a graph 600 illustrating an overall number of insurance claims that may be potentially eligible for processing via an expedited workflow in accordance with some embodiments. Initially, a set of insurance claim 612 is received and all might be considered as being in a pool of claims that are potentially eligible for expedited processing. A first filter is then applied and acts to remove some of those claims from that pool creating a reduced subset of claims 614. Further filters may be applied as appropriate until a final subset of claims 616 is identified. Those claims may then be handled via the expedited workflow.

Consider a set C representing all received insurance claims $\{c_1, c_2, \ldots c_n\}$. According to some embodiments, any techniques may be used to identify the subset of those claims that are eligible for expedited processing. For example, the following subset might be identified:

$$\text{all claims in C that} \not\subset \text{complex and} \not\subset \text{invalid}$$

where "complex" refers to the subset of claims that have complexity issues making them ineligible for expedited processing (e.g., serious injuries, difficult determination of liability) and "invalid" refers to the subset of claims that may have compensability issues (e.g., it might not be clear that the claim is covered by a valid insurance policy). Note that such identification might be performed in any number of different ways. In some embodiments described herein a sequence of "exclusion filters" are utilized. In some cases, "inclusion filters" might be utilized instead or in addition to exclusion filters. As other examples, a script or Structured Query Language ("SQL") protocol operation might be used to identify appropriate claims.

Figure 7:
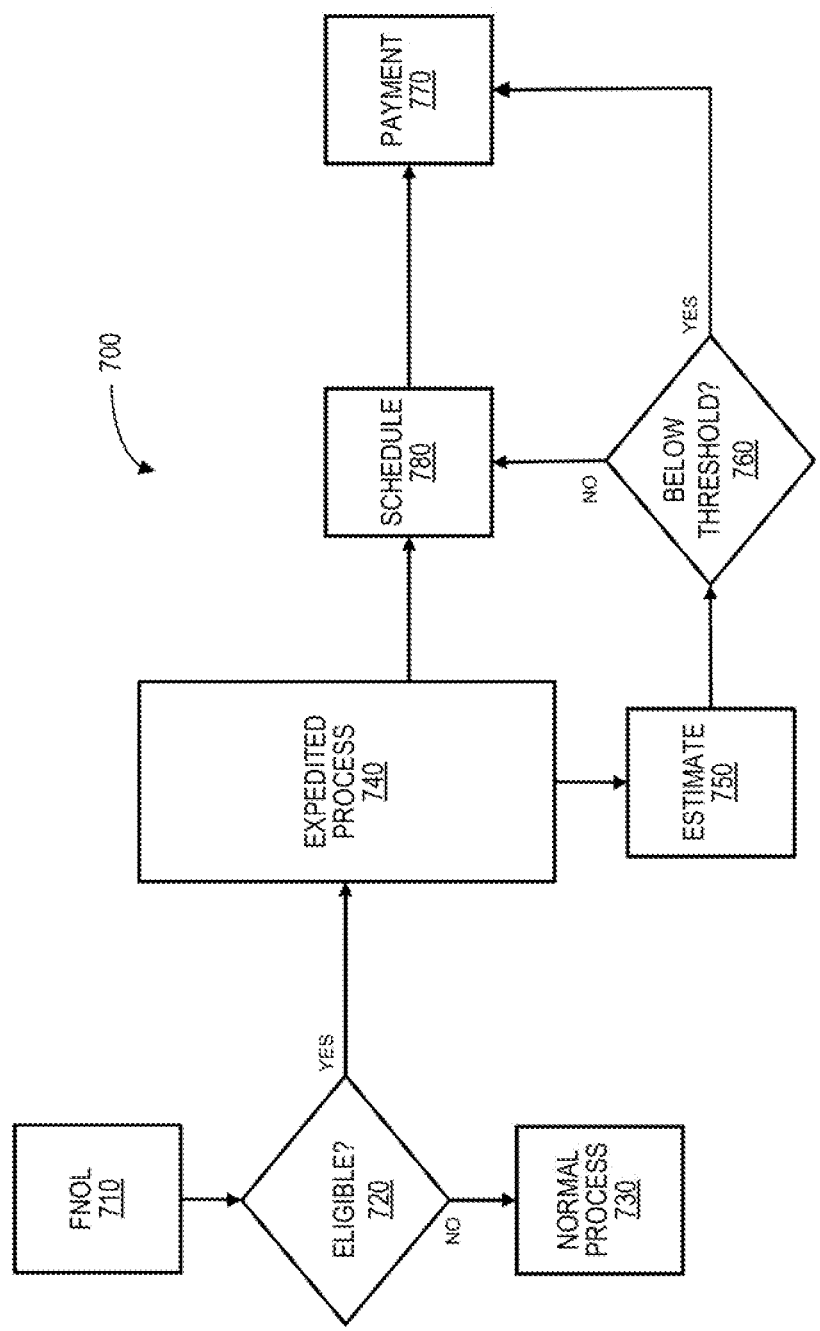
FIG. 7 is an insurance claim process flow in accordance with some embodiments.

FIG. 7 is an insurance claim process flow 700 in accordance with some embodiments. The flow 700 begins in connection with a First Notice Of Loss ("FNOL") event 710. The FNOL event 710 may be associated with the collection of information, including vehicle information, party information, contact information, preferred types of communication channels, and detailed facts about the loss. It may then be determined at 720 (e.g., via the application of exclusion filters and rules) whether or not the claim is eligible for expedited workflow processing. If the claim is not eligible at 720, it may undergo a normal claim handling process at 730.

If the claim is eligible at 720, the expedited workflow processing begins at 740. The expedited workflow processing 740 may include, for example, contacting an insured to verify facts about the loss, coverage, and/or liability associated with claim. The insured may be provided with expectations about the next steps in the process and one or more third parties may be contacted. According to some embodiments, information about an estimate (e.g., associated with an automobile repair) may be determined at 750. If the value of the estimate is below a pre-determined threshold value at 760, payment can be made at 770 (and the claim file may eventually be closed by the handler). If the value of the estimate is not below the predetermined threshold value at 760, additional steps may be scheduled at 780 before payment is made at 770. The additional steps 780 may involve getting more estimates and/or having the claim handler review information about the claim in more detail.

Thus, embodiments may provide an efficient and automated ability to identify insurance claims that are eligible for expedited processing. According to some embodiments, a determination regarding expedited processing may be based at least in part on rules created by a predictive model trained with historical insurance claim information. For example, the creation of exclusion filters might be aided by data modeling, input from an insurer's claim subject matter experts, and analysis of historical claim experience. The following are some variables that might be used by a predictive model to help identify appropriate exclusion filters:

Date of birth,
Injury/diagnosis,
Salary, and
Location of accident.

According to some embodiments, the predictive model utilizes different groupings associated with different sets and/or weights of relevant factors. For example, depending on high level grouping, different variables may be significant and/or relevant and the weightings of common variables may be different.

In general, and for the purposes of introducing concepts of embodiments of the present invention, a computer system may incorporate a "predictive model." As used herein, the phrase "predictive model" might refer to, for example, any of a class of algorithms that are used to understand relative factors contributing to an outcome, estimate unknown outcomes, discover trends, and/or make other estimations based on a data set of factors collected across prior trials. Note that a predictive model might refer to, but is not limited to, methods such as ordinary least squares regression, logistic regression, decision trees, neural networks, generalized linear models, and/or Bayesian models. The predictive model is trained with historical claim transaction data, and is applied to current claim transactions to determine how the current claim transactions should be handled. Both the historical claim transaction data and data representing the current claim transactions might include, according to some embodiments, indeterminate data or information extracted therefrom. For example, such data/information may come from narrative and/or medical text notes associated with a claim file.

Figure 8:
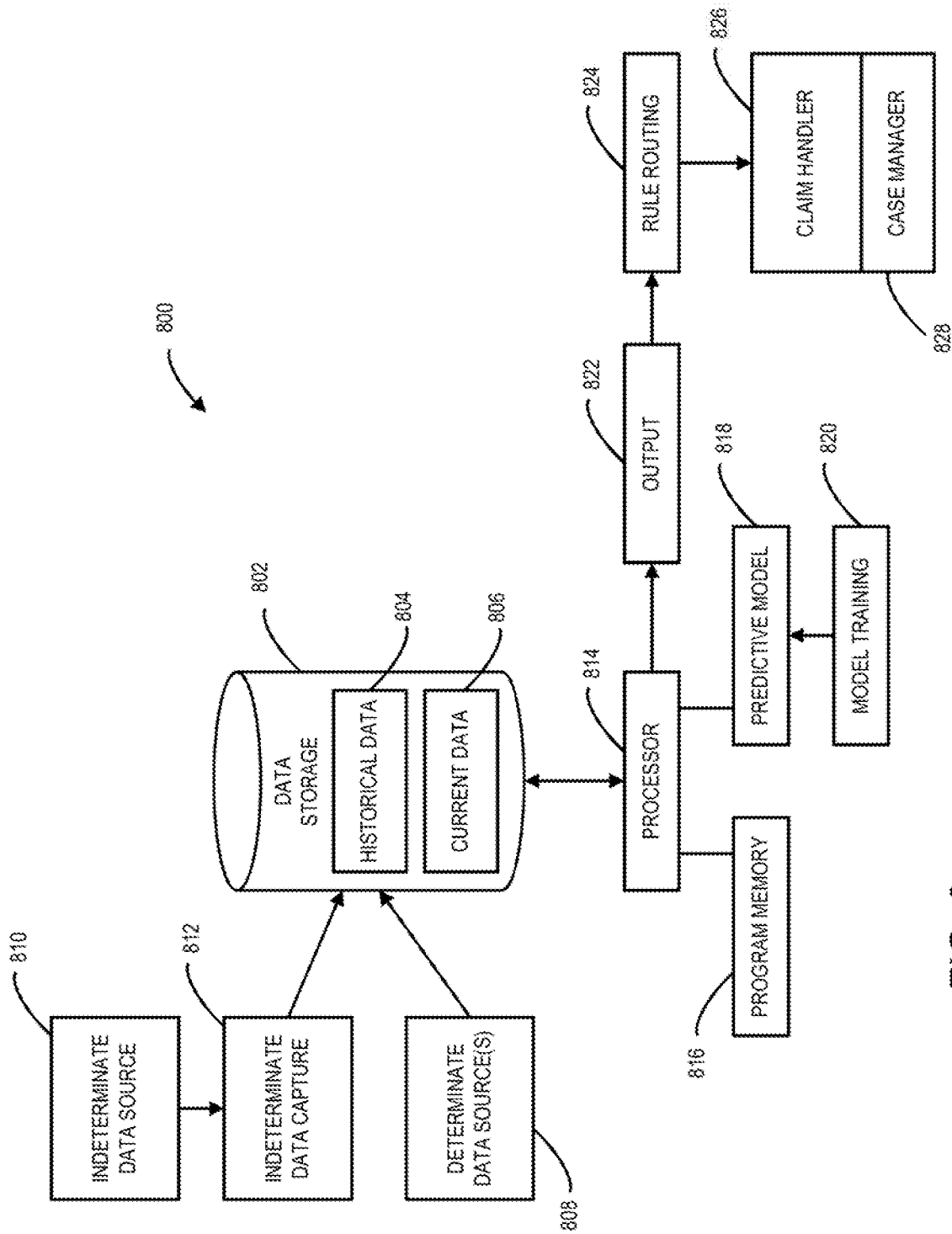
FIG. 8 is a partially functional block diagram that illustrates aspects of a computer system provided in accordance with some embodiments of the invention.

Features of some embodiments associated with a predictive model will now be described by first referring to FIG. 8. FIG. 8 is a partially functional block diagram that illustrates aspects of a computer system 800 provided in accordance with some embodiments of the invention. For present purposes it will be assumed that the computer system 800 is operated by an insurance company (not separately shown) for the purpose of referring certain claims to insurance claim workflows and/or handlers as appropriate.

The computer system 800 includes a data storage module 802. In terms of its hardware the data storage module 802 may be conventional, and may be composed, for example, by one or more magnetic hard disk drives. A function performed by the data storage module 802 in the computer system 800 is to receive, store and provide access to both historical claim transaction data (reference numeral 804) and current claim transaction data (reference numeral 806). As described in more detail below, the historical claim transaction data 804 is employed to train a predictive model to provide an output that indicates how a claim should by handled program (e.g., expedited or non-expedited processing), and the current claim transaction data 806 is thereafter analyzed by the predictive model. Moreover, as time goes by, and results become known from processing current claim transactions, at least some of the current claim transactions may be used to perform further training of the predictive model. Consequently, the predictive model may thereby adapt itself to changing claim patterns.

Either the historical claim transaction data 804 or the current claim transaction data 806 might include, according to some embodiments, determinate and indeterminate data. As used herein and in the appended claims, "determinate data" refers to verifiable facts such as the date of birth, age or name of a claimant or name of another individual or of a business or other entity; a type of injury, accident, sickness, or pregnancy status; a medical diagnosis; a date of loss, or date of report of claim, or policy date or other date; a time of day; a day of the week; a vehicle identification number, a geographic location; and a policy number.

As used herein and in the appended claims, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about how an accident occurred.

The determinate data may come from one or more determinate data sources 808 that are included in the computer system 800 and are coupled to the data storage module 802. The determinate data may include "hard" data like the claimant's name, date of birth, social security number, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 810, and may be extracted from raw files or the like by one or more indeterminate data capture modules 812. Both the indeterminate data source(s) 810 and the indeterminate data capture module(s) 812 may be included in the computer system 800 and coupled directly or indirectly to the data storage module 802. Examples of the indeterminate data source(s) 810 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 812 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 800 also may include a computer processor 814. The computer processor 814 may include one or more conventional microprocessors and may operate to execute programmed instructions to provide functionality as described herein. Among other functions, the computer processor 814 may store and retrieve historical claim transaction data 804 and current claim transaction data 806 in and from the data storage module 802. Thus the computer processor 814 may be coupled to the data storage module 802.

The computer system 800 may further include a program memory 816 that is coupled to the computer processor 814. The program memory 816 may include one or more fixed storage devices, such as one or more hard disk drives, and one or more volatile storage devices, such as RAM (random access memory). The program memory 816 may be at least partially integrated with the data storage module 802. The program memory 816 may store one or more application programs, an operating system, device drivers, etc., all of which may contain program instruction steps for execution by the computer processor 814.

The computer system 800 further includes a predictive model component 818. In certain practical embodiments of the computer system 800, the predictive model component 818 may effectively be implemented via the computer processor 814, one or more application programs stored in the program memory 816, and data stored as a result of training operations based on the historical claim transaction data 804 (and possibly also data resulting from training with current claims that have been processed). In some embodiments, data arising from model training may be stored in the data storage module 802, or in a separate data store (not separately shown). A function of the predictive model component 818 may be to determine an appropriate workflow for current claim transactions. The predictive model component may be directly or indirectly coupled to the data storage module 802.

The predictive model component 818 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 800 includes a model training component 820. The model training component 820 may be coupled to the computer processor 814 (directly or indirectly) and may have the function of training the predictive model component 818 based on the historical claim transaction data 804. (As will be understood from previous discussion, the model training component 820 may further train the predictive model component 818 as further relevant claim transaction data becomes available.) The model training component 820 may be embodied at least in part by the computer processor 814 and one or more application programs stored in the program memory 816. Thus the training of the predictive model component 818 by the model training component 820 may occur in accordance with program instructions stored in the program memory 816 and executed by the computer processor 814.

In addition, the computer system 800 may include an output device 822. The output device 822 may be coupled to the computer processor 814. A function of the output device 822 may be to provide an output that is indicative of (as determined by the trained predictive model component 818) particular exclusion filter rules for the current claim transactions. The output may be generated by the computer processor 814 in accordance with program instructions stored in the program memory 816 and executed by the computer processor 814. More specifically, the output may be generated by the computer processor 814 in response to applying the data for the current claim transaction to the trained predictive model component 818. The output may, for example, be a true/false flag or a number within a predetermined range of numbers. In some embodiments, the output device may be implemented by a suitable program or program module executed by the computer processor 814 in response to operation of the predictive model component 818.

Still further, the computer system 800 may include a rule routing module 824. The rule routing module 824 may be implemented in some embodiments by a software module executed by the computer processor 814. The rule routing module 824 may have the function of directing workflow based on the output from the output device. Thus the rule routing module 824 may be coupled, at least functionally, to the output device 822. In some embodiments, for example, the rule routing module 824 may direct workflow by referring, to a claim handler 826, current claim transactions analyzed by the predictive model component 818 and found to be associated with one or more exclusion or inclusion filters. In particular, these current claim transactions may be referred to case manager 828 who is associated with the claim handler 826. The claim handler 826 may be a part of the insurance company that operates the computer system 800, and the case manager 828 might be an employee of the insurance company.

Figure 9:
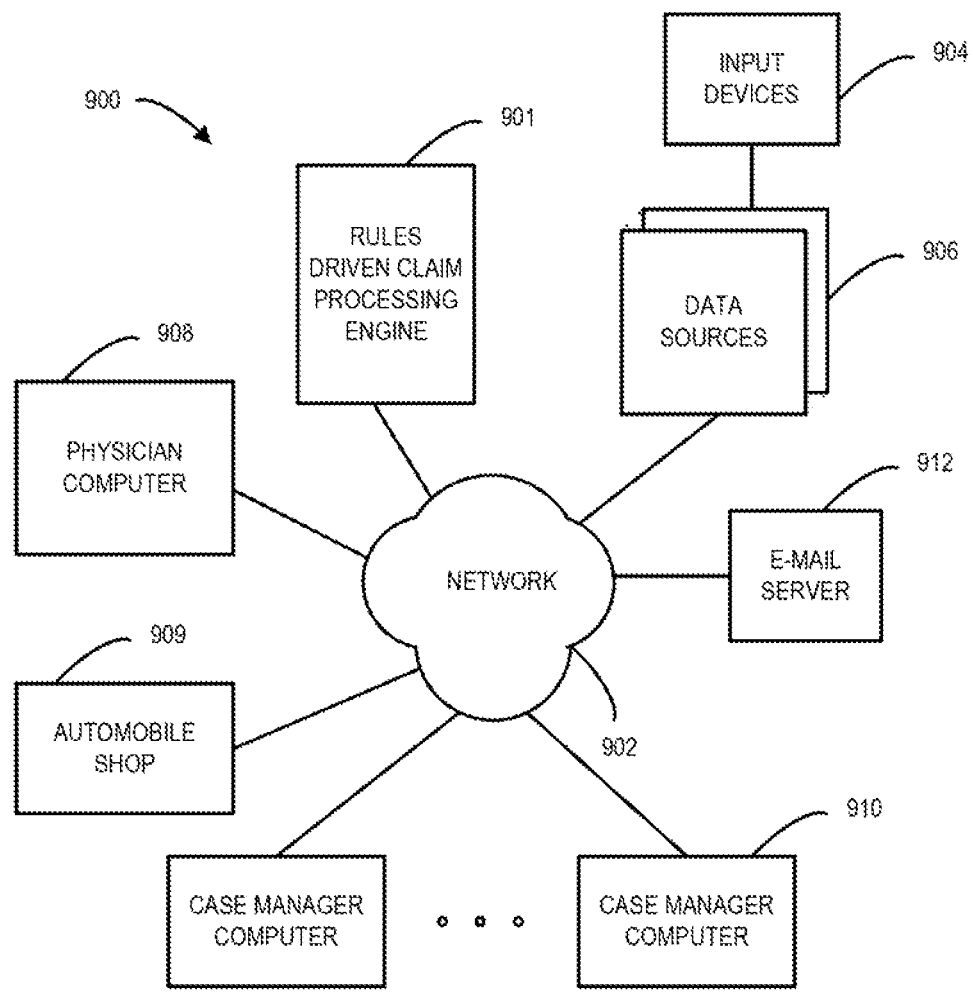
FIG. 9 is a block diagram that provides another representation of aspects of the system of FIG. 8.

FIG. 9 is another block diagram that presents a computer system 900 in a somewhat more expansive or comprehensive fashion (and/or in a more hardware-oriented fashion). The computer system 900, as depicted in FIG. 9, includes a "rules driven claim processing engine" 901 to automatically and selectively assess newly received insurance claims for the insurance company. As seen from FIG. 9, the computer system 900 may further include a conventional data communication network 902 to which the rules driven claim processing engine 901 is coupled.

FIG. 9 also shows, as parts of computer system 900, data input device(s) 904 and data source(s) 906, the latter (and possibly also the former) being coupled to the data communication network 902. The data input device(s) 904 and the data source(s) 906 may collectively include the devices 808, 810 and 812 discussed above with reference to FIG. 8. More generally, the data input device(s) 904 and the data source(s) 906 may encompass any and all devices conventionally used, or hereafter proposed for use, in gathering, inputting, receiving and/or storing information for insurance company claim files.

Still further, FIG. 9 shows, as parts of the computer system 900, personal computer 908 assigned for use by one or more physicians (who may be associated with the insurance company's long term disability insurance program), automobile shop computer 909 (e.g., to transmit repair estimates), and personal computers 910 assigned for use by case managers (who might also be associated with team leaders and/or claim handlers the long term disability insurance program). The personal computers 908, 909, 910 may be coupled to the data communication network 902.

Also included in the computer system 900, and coupled to the data communication network 902, is an electronic mail server computer 912. The electronic mail server computer 912 provides a capability for electronic mail messages to be exchanged among the other devices coupled to the data communication network 902. Thus the electronic mail server computer 912 may be part of an electronic mail system included in the computer system 900. The computer system 900 may also be considered to include further personal computers (not shown), including, e.g., computers which are assigned to individual claim handlers or other employees of the insurance company.

Figure 10:
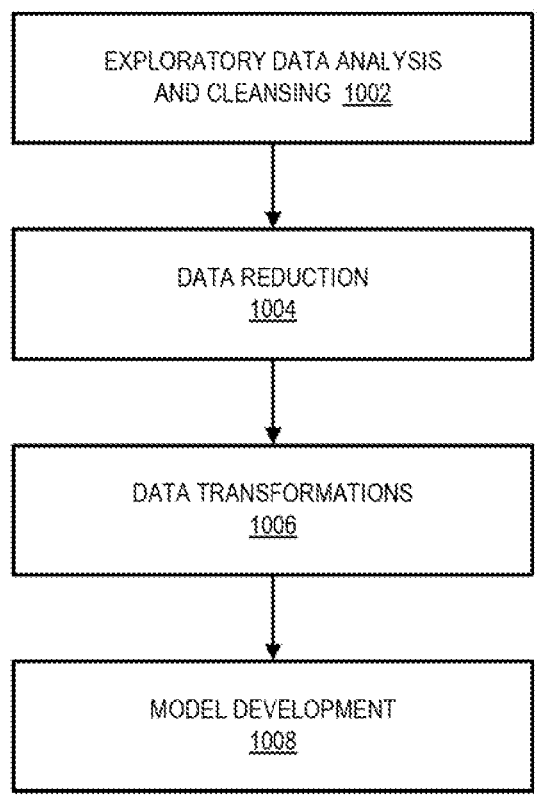
FIG. 10 is a flow chart illustrating how a predictive model might be trained according to some embodiments.

According to some embodiments, the rules driven claim processing engine 901 uses a predictive model to facilitate a provisioning of claim handlers. Note that the predictive model might be designed and/or trained in a number of different ways. For example, FIG. 10 is a flow chart illustrating how a predictive model might be created according to some embodiments. At 1002, data to be input to the predictive model may be analyzed, scrubbed, and/or cleaned. This process might involve a broad review of the relevant variables that may be included in the sample data. Variables might be examined for the presence of erroneous values, such as incorrect data types or values that don't make sense. Observations with such "noisy" data or missing data may be removed from the sample. Similarly, any data points that represent outliers are also managed.

At 1004, a data reduction process might be performed. This might occur, for example, between variables in the data sample and/or within specific variables. According to some embodiments, certain variables may be associated with one another and the number of these variables may be reduced. For example, it might be noted that back injuries should not be handled via an expedited workflow process. Within certain variables, the raw values may represent a level of information that is too granular. These raw values might then be categorized to reduce the granularity. A goal of the data reduction process may be to reduce the dimensionality of the data by extracting factors or clusters that may account for the variability in the data.

At 1006, any necessary data transformations may be performed. Transformations of dependent and/or independent variables in statistical models can be useful for improving interpretability, model fit, and/or adherence to modeling assumptions. Some common methods may include normalizations of variables to reduce the potential effects of scale and dummy coding or other numeric transformations of character variables.

Once these steps are complete, the predictive model may be developed at 1008. Depending on the nature of the desired prediction, various modeling techniques may be utilized and compared. The list of independent variables may be narrowed down using statistical methods as well as business judgment. Lastly, the model coefficients and/or weights may be calculated and the model algorithm may be completed. For example, it might be determined that back injuries require a high degree of management (and thus, according to some embodiments, a back injury might be weighted more as compared to a shoulder injury and thus be more likely to end up excluded from expedited workflow processing).

Figure 11:
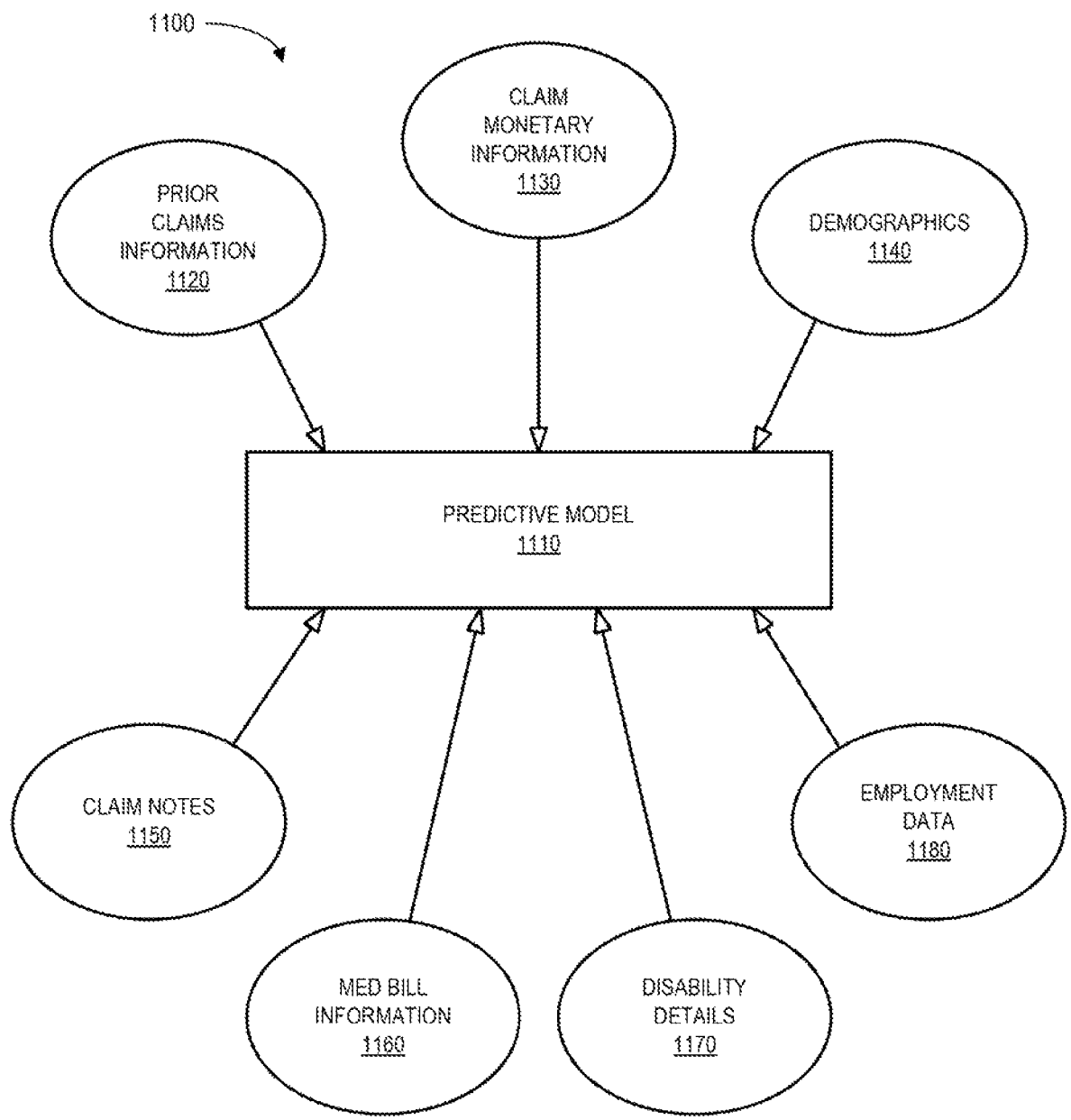
FIG. 11 illustrates predictive model inputs according to some embodiments.

Note that many different types of data might be used to create, evaluate, and/or use a predictive model. For example, FIG. 11 is a block diagram of a system 1100 illustrating inputs to a predictive model 1110 according to some embodiments. In this example, the predictive model 1110 might receive information about prior insurance claims 1120 (e.g., historical data). Moreover, the predictive model 1110 might receive monetary information about claims 1130 (e.g., a total amount of payments made in connection with a claim) and/or demographic information 1140 (e.g., the age or sex of a claimant). According to some embodiments, claim notes 1150 are input to the predictive model 1110 (e.g., and keywords may be extracted from the notes 1150). Other types of information that might be provided to the predictive model 1110 include medical bill information 1160 (e.g., including information about medical care that was provided to a claimant), disability details 1170 (e.g., which part or parts of the body have been injured), and employment data 1180 (e.g., an employee's salary or how long an employee has worked for an employer).

The predictive model 1110, in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior data and outcomes known to the insurance company. The specific data and outcomes analyzed vary depending on the desired functionality of the particular predictive model 1110. The particular data parameters selected for analysis in the training process are determined by using regression analysis and/or other statistical techniques known in the art for identifying relevant variables in multivariable systems. The parameters can be selected from any of the structured data parameters stored in the present system, whether the parameters were input into the system originally in a structured format or whether they were extracted from previously unstructured text.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system, comprising:
an intake computer system configured to receive data records at a rate of thousands of submissions per year; and
a rules driven processing engine for sequentially applying a selected combination of filters to the data records to effect an expedited processing data flow which reduces a number of data records processed according to a normal processing data flow, the rules driven processing engine communicatively interposed between the intake computer system and a plurality of handler computing devices, each corresponding to a different handler, and configured to:
receive, from the intake computer system, one or more electronic files including the data records;
reduce the data records to generate a first subset of reduced data records by application of a first filter rule to the data records that removes each of the data records that does not correspond to a valid policy;
responsive to generation of the first subset of reduced data records, reduce the first subset of data records to generate a second subset of reduced data records by application of a second filter rule to the first subset of reduced data records that removes each of the data records of the first subset of reduced data records that corresponds to pre-determined legal jurisdictions;
responsive to generation of the second subset of reduced data records, reduce the second subset of reduced data records to generate a third subset of reduced data records by application of a third filter rule to the second subset of reduced data records that removes each of the data records of the second subset of reduced data records that corresponds to a pre-determined injury type, wherein the third subset of reduced data records comprises a final subset of reduced data records;
automatically transmit the data records removed by sequential application of the selected combination of filters to a normal workflow module of a workflow management system configured to assign each of the removed data records to a handler based upon a complexity of a claim corresponding to the data record and handler workload, and transmit an electronic file corresponding to each of the removed data records to one of the plurality of handler computing devices;
automatically transmit the final subset of reduced data records not removed by sequential application of the selected combination of filters to an expedited workflow module of the workflow management system, the expedited workflow module configured to:
  generate a payment for each of the data records of the final subset of reduced data records which has a payment value below a pre-determined threshold;
  transmit each of the data records of the final subset of reduced data records which has a payment value that is not below the pre-determined threshold to one of the plurality of handler computing devices for processing by a handler who specializes in processing of data records transmitted to the expedited workflow module; and
  output, to a computing device, a display including data indicative of the final subset of reduced data records.

2. The system of claim 1, wherein the rules driven processing engine is further configured to:
  responsive to generation of the third subset of reduced data records, reduce the third subset of reduced data records to generate a fourth subset of reduced data records by application of a fourth filter rule to the third subset of reduced data records that removes each of the data records of the third subset of reduced data records that corresponds to a pre-determined policy type; and
  automatically transmit the data records removed by application of the fourth filter rule to the normal workflow module of the workflow management system;
  wherein the fourth subset of reduced data records comprises the final subset of reduced data records transmitted to the expedited workflow module of the workflow management system.

3. The system of claim 1, wherein the rules driven processing engine is further configured to:
  responsive to generation of the third subset of reduced data records, reduce the third subset of reduced data records to generate a fourth subset of reduced data records by application of a fourth filter rule to the third subset of reduced data records that removes each of the data records of the third subset of reduced data records that corresponds to a pre-determined threshold monetary amount; and
  automatically transmit the data records removed by application of the fourth filter rule to the normal workflow module of the workflow management system;
  wherein the fourth subset of reduced data records comprises the final subset of reduced data records transmitted to the expedited workflow module of the workflow management system.

4. The system of claim 1, wherein the rules driven processing engine is further configured to:
  responsive to generation of the third subset of reduced data records, reduce the third subset of reduced data records to generate a fourth subset of reduced data records by application of a fourth filter rule to the third subset of reduced data records that removes each of the data records of the third subset of reduced data records that corresponds to a pre-determined liability determination; and
  automatically transmit the data records removed by application of the fourth filter rule to the normal workflow module of the workflow management system;
  wherein the fourth subset of reduced data records comprises the final subset of reduced data records transmitted to the expedited workflow module of the workflow management system.

5. The system of claim 1, wherein the rules driven processing engine is further configured to:
  responsive to generation of the third subset of reduced data records, reduce the third subset of reduced data records to generate a fourth subset of reduced data records by application of a fourth filter rule to the third subset of reduced data records that removes each of the data records of the third subset of reduced data records that corresponds to a pre-determined geographic location; and
  automatically transmit the data records removed by application of the fourth filter rule to the normal workflow module of the workflow management system;
  wherein the fourth subset of reduced data records comprises the final subset of reduced data records transmitted to the expedited workflow module of the workflow management system.

6. The system of claim 1, wherein the rules driven processing engine is further configured to automatically transmit information about the third subset of data records to at least one of: (i) an email server, (ii) a report generator, and (iii) a calendar application.

7. The system of claim 1, wherein application of at least one of the first filter rule, the second filter rule, and the third filter rule corresponds to receipt of data indicative of a First Notice Of Loss.

8. The system of claim 1, wherein at least one of the first filter rule, the second filter rule, and the third filter rule is based at least in part on a predictive model trained by:
  applying one or both of a variable association data reduction process and a granularity reduction process to historical claim processing data records to generate reduced historical claim processing data records and reduce a dimensionality of the historical claim processing data records; and
  training, based upon the reduced historical claim processing data records, the predictive model to generate exclusion filters for assignment of future data records corresponding to workers' compensation claims.

9. A system, comprising:
  an intake computer system configured to receive data records received at a rate of thousands of submissions per year; and
  a rules driven processing engine for sequentially applying a selected combination of filters to the data records to effect an expedited processing data flow which reduces a number of data records processed according to a normal processing data flow, the rules driven processing engine communicatively interposed between the intake computer system and a plurality of handler computing devices, each corresponding to a different handler the rules driven processing engine configured to:
    receive, by a processing engine communication device from the intake computer system, one or more electronic files including the data records;
    reduce the data records to generate a first subset of reduced data records by application of a first filter rule to the data records that removes each of the data records that does not correspond to a valid policy;
    responsive to generation of the first subset of reduced data records, reduce the first subset of data records to generate a second subset of reduced data records by application of a second filter rule to the first subset of reduced data records that removes each of the data records of the first subset of reduced data records that corresponds to pre-determined legal jurisdictions;
    responsive to generation of the second subset of reduced data records, reduce the second subset of reduced data records to generate a third subset of reduced data records by application of a third filter rule to the second subset of reduced data records that removes each of the data records of the second subset of reduced data records that corresponds to a pre-determined injury type, wherein the third subset of reduced data records comprises a final subset of reduced data records;

automatically transmit the data records removed by sequential application of the selected combination of filters to a normal workflow module of a workflow management system configured to assign each of the removed data records to a handler based upon a complexity of a claim corresponding to the data record and handler workload, and transmit an electronic file corresponding to each of the removed data records to one of the plurality of handler computing devices, wherein the data records removed by sequential application of the selected combination of filters comprise a reduced subset of the data records received from the intake computer system; and automatically transmit the final subset of reduced data records not removed by sequential application of the selected combination of filters to an expedited workflow module of the workflow management system, the expedited workflow module configured to generate a payment for each of the data records of the final subset of reduced data records having a corresponding payment value below a pre-determined threshold, without each such data record being transmitted to one of the plurality of handler computing devices for processing by a handler.

10. The system of claim 9, wherein the rules driven processing engine is further configured to:
responsive to generation of the third subset of reduced data records, reduce the third subset of reduced data records to generate a fourth subset of reduced data records by application of a fourth filter rule to the third subset of reduced data records that removes each of the data records of the third subset of reduced data records that corresponds to a pre-determined disability type; and
automatically transmit the data records removed by application of the fourth filter rule to the normal workflow module of the workflow management system;
wherein the fourth subset of reduced data records comprises the final subset of reduced data records transmitted to the expedited workflow module of the workflow management system.

11. The system of claim 9, wherein the rules driven processing engine is further configured to:
responsive to generation of the third subset of reduced data records, reduce the third subset of reduced data records to generate a fourth subset of reduced data records by application of a fourth filter rule to the third subset of reduced data records that removes each of the data records of the third subset of reduced data records that corresponds to a pre-determined indemnity payment probability; and
automatically transmit the data records removed by application of the fourth filter rule to the normal workflow module of the workflow management system;
wherein the fourth subset of reduced data records comprises the final subset of reduced data records transmitted to the expedited workflow module of the workflow management system.

12. The system of claim 9, wherein the rules driven processing engine is further configured to:
responsive to generation of the third subset of reduced data records, reduce the third subset of reduced data records to generate a fourth subset of reduced data records by application of a fourth filter rule to the third subset of reduced data records that removes each of the data records of the third subset of reduced data records that corresponds to a pre-determined compensability issue; and
automatically transmit the data records removed by application of the fourth filter rule to the normal workflow module of the workflow management system;
wherein the fourth subset of reduced data records comprises the final subset of reduced data records transmitted to the expedited workflow module of the workflow management system.

13. The system of claim 9, wherein data corresponding to the data records is received by the intake computer system via at least one of: (i) a submitted paper claim, (ii) a telephone call center, and (iii) an online claim submission web page.

14. The system of claim 9, wherein the rules driven processing engine is further configured to output an indication of the third subset of data records to a team leader computing device.

15. The system of claim 9, wherein application of at least one of the first filter rule, the second filter rule, and the third filter rule corresponds to receipt of data indicative of a First Notice Of Loss.

16. The system of claim 9, wherein at least one of the first filter rule, the second filter rule, and the third filter rule is based at least in part on a predictive model trained by:
applying one or both of a variable association data reduction process and a granularity reduction process to historical claim processing data records to generate reduced historical claim processing data records and reduce a dimensionality of the historical claim processing data records; and
training, based upon the reduced historical claim processing data records, the predictive model to generate exclusion filters for assignment of future data records corresponding to workers' compensation claims;
wherein the predictive model is implemented by application of at least one of: (i) a neural network, (ii) a Bayesian network, (iii) a Hidden Markov model, (iv) an expert system, (v) a decision tree, (vi) a collection of decision trees, (vii) a support vector machine, and (viii) weighted factors.

* * * * *